United States Patent
Reiner et al.

(10) Patent No.: US 6,807,046 B2
(45) Date of Patent: Oct. 19, 2004

(54) POWER CAPACITOR AND USE AND METHOD RELATED THERETO

(75) Inventors: Eva Reiner, Karlstad (SE); Kenneth Dowling, Kungsangen (SE); Sari Laihonen, Hagersten (SE)

(73) Assignee: ABB AB, Vasteras (SE)

( * ) Notice: Subject to any disclaimer, the term of this patent is extended or adjusted under 35 U.S.C. 154(b) by 28 days.

(21) Appl. No.: 10/169,723
(22) PCT Filed: Jan. 15, 2001
(86) PCT No.: PCT/SE01/00062
§ 371 (c)(1), (2), (4) Date: Dec. 9, 2002
(87) PCT Pub. No.: WO01/52284
PCT Pub. Date: Jul. 19, 2001

(65) Prior Publication Data
US 2003/0133255 A1 Jul. 17, 2003

(30) Foreign Application Priority Data
Jan. 14, 2000 (SE) .............................................. 0000118

(51) Int. Cl.[7] .............................................. H01G 4/228
(52) U.S. Cl. .................... 361/306.1; 361/524; 361/530; 361/318
(58) Field of Search .......................... 361/319, 326–328, 361/521–522, 517, 530, 535, 541, 524; 29/29.41

(56) References Cited

U.S. PATENT DOCUMENTS

| 4,813,116 A | * | 3/1989 | Thiel et al. ................. 29/25.42 |
| 5,359,487 A | * | 10/1994 | Carrico et al. ............ 361/301.5 |
| 5,708,558 A | * | 1/1998 | Dequasie .................. 361/301.5 |
| 6,585,917 B2 | * | 7/2003 | Sletson et al. .............. 252/570 |

FOREIGN PATENT DOCUMENTS

| JP | 7161268 | 6/1995 |
| JP | 10326721 | 12/1998 |

* cited by examiner

Primary Examiner—Anthony Dinkins
(74) Attorney, Agent, or Firm—Oblon, Spivak, McClelland, Maier & Neustadt, P.C

(57) ABSTRACT

A power capacitor for high voltage including at least one capacitor element enclosed in a container, use of a gel in such a capacitor, and a method for manufacture of the capacitor. A space is formed between each capacitor element and the container. The power capacitor can handle problems concerning oil leakage in such a capacitor. In the power capacitor the space is filled up by a dielectric fluid including a gelling component. Because a gel is used instead of oil, the risk of oil leakage is eliminated.

24 Claims, 3 Drawing Sheets

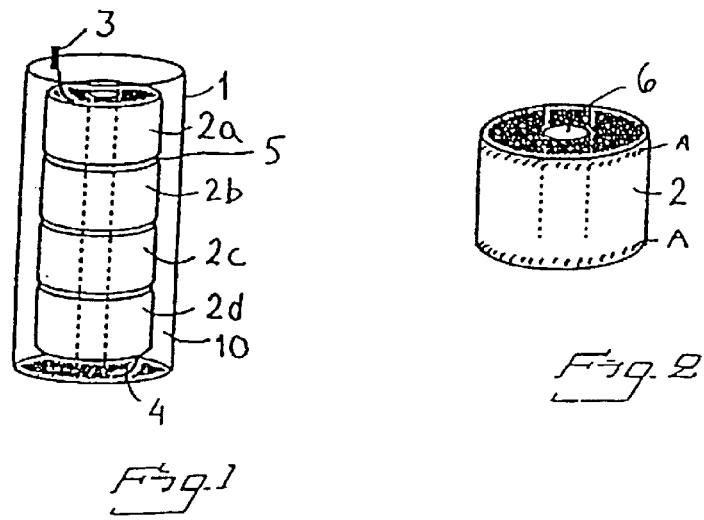
Fig. 1
Fig. 2
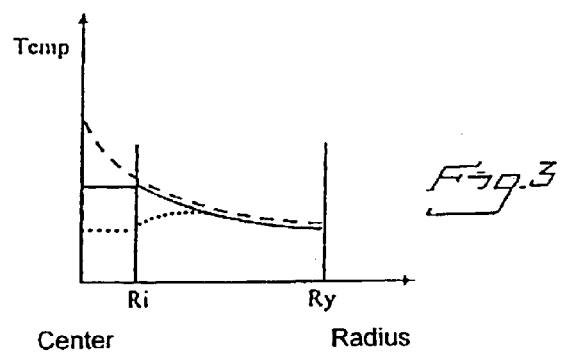
Fig. 3
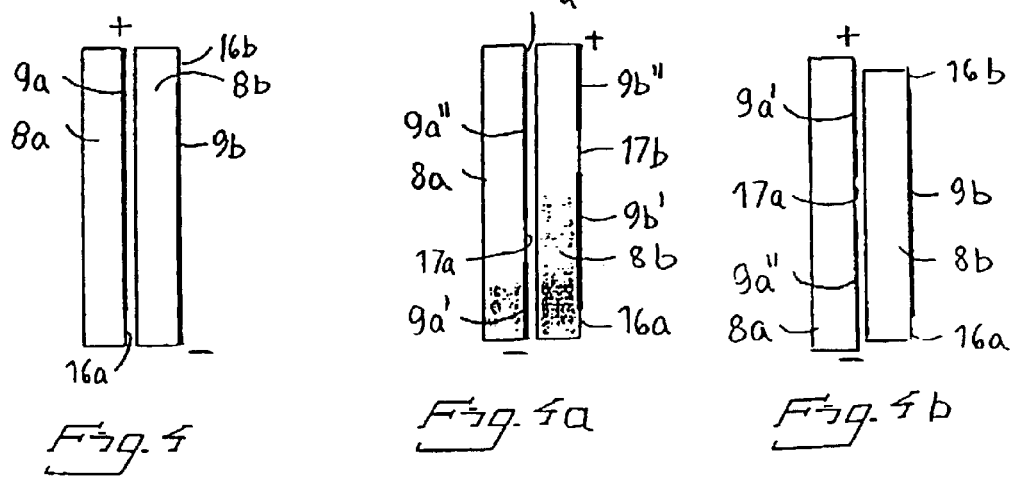
Fig. 4
Fig. 4a
Fig. 4b

POWER CAPACITOR AND USE AND METHOD RELATED THERETO

TECHNICAL FIELD

The present invention relates to a power capacitor of the type described in the preamble to claim 1. The power capacitor in accordance with the invention is primarily intended for a rated voltage exceeding 1 kV, e.g. 5 kV, preferably at least 10 kV.

Power capacitors are important components in systems for the transmission and distribution of electric power. Power capacitor installations are used primarily to increase the power-transmission capability through parallel and series compensation for voltage stabilisation by means of static var-systems and as filters for the elimination of harmonics.

Second and third aspects of the invention relate to use of the type described in claim 21, and to a method of the type described in claim 23.

Capacitors have a phase angle close to 90°, and therefore generate reactive power. By connecting capacitors in the vicinity of the components that consume reactive power, the desired reactive power can be generated there. Cables can thus be utilised to the full for transmitting active power. The consumption of reactive power in a load may vary and it is desirable to constantly generate a quantity of reactive power corresponding to the consumption. For this purpose, a plurality of capacitors are connected via series and/or parallel connection in a capacitor bank. The number of capacitors required to correspond to the consumed reactive can be connected in. Compensating for consumed power by utilising capacitors in the manner described above is known as phase compensation. For this purpose a capacitor bank in the form of a shunt battery is arranged in the vicinity of the components consuming reactive power. Such a shunt battery consists of a plurality of capacitors connected together. Each capacitor comprises a plurality of capacitor elements. The structure of such a conventional capacitor is described below.

A shunt battery usually comprises a number of chains of a plurality of capacitors connected in series. The number of chains is determined by the number of phases, usually three. The first capacitor in a chain is thus connected to a cable for transmitting electric power to the consuming component. The cable for transmitting is arranged a certain distance from the ground or from points in the surroundings with earth potential. This distance is dependent on the voltage of the cable. The capacitors are then connected in series from the first capacitor, which is connected to the cable, and downwards. A second capacitor arranged at the opposite end of the chain of series-connected capacitors is connected to earth potential or to a point in the electrical system having zero potential (e.g. non-earthed 3-phase system). The number of capacitors and their design are determined so that the permissible voltage (rated voltage) over the series-connected capacitors corresponds to the voltage of the cable. A plurality of capacitors are therefore series-connected and arranged in stands or on platforms insulated from earth potential. Such a capacitor bank thus includes a plurality of different components and requires relatively large quantities of material. It also requires a relative robust construction so that the stand/platform can withstand the effects of wind, earthquakes, etc. Considerable work is thus required to construct such a capacitor bank. This problem is particularly noticeable when the capacitor bank consists of a large number of capacitors. The capacitor bank also takes up a relatively large area on the ground.

Long cables for alternating voltage are inductive and consume reactive power. Capacitor banks for series-compensation are therefore arranged with regular spacing along such a cable in order to generate the necessary reactive power. A plurality of capacitors is connected in series to compensate the inductive voltage drop. In a capacitor bank for series-compensation, as opposed to a shunt battery, the series-connection of capacitors usually only takes up part of the voltage in the cable. The chains of series-connected capacitors included in the capacitor bank for series compensation are also arranged in series with the cable to be compensated.

A conventional capacitor bank comprises a plurality of capacitors. Such a capacitor in turn comprises a plurality of capacitor elements in the form of capacitor rolls. The capacitor rolls are flattened and stacked one on top of the other to form a stack 1 m tall, for instance. A very large number of dielectric films with intermediate metal layers will be arranged in parallel in the vertical direction of the stack. When a voltage applied over the stack increases, the stack will be compressed somewhat in vertical direction, due to Coulomb forces that act between the metal layers. For the same reason, if the voltage decreases the stack will expand somewhat in vertical direction. The stack formed has a specific mechanical resonance frequency or natural frequency, which is relatively low. The mechanical resonance frequency of the stack is amplified by specific frequencies of the current, which may produce a loud noise. The mains frequency constitutes such a frequency. However, amplification of the mechanical resonance frequency can also be effected by harmonics in the current.

An example of a power capacitor of this known type is described in U.S. Pat. No. 5,475,272. A high-voltage capacitor constructed from a plurality of capacitor elements stacked one on top of the other and placed in a common container, is thus described here. The container is made of metal in conventional manner. The electrical lead-throughs are made of porcelain or polymer. The publication also describes various alternative couplings for connecting the capacitor elements in series or in parallel.

DESCRIPTION OF THE INVENTION

In known capacitors of this type the capacitor elements are impregnated with oil. The oil is also arranged to surround the capacitor elements and thus fill up the space between these and the wall of the container. Oil is satisfactory from the insulation aspect but entails a number of drawbacks. Damage to the container or defective sealing may result in oil leakage which may damage the function of the capacitor as well as contaminating the environment.

Against this background, the object of the present invention is to overcome the problem of oil leakage from a power capacitor of the type under consideration.

From a first aspect of the invention this object is achieved by a power capacitor of the type described in the preamble to claim 1 comprising the characteristic features defined in the characterizing part of the claim. The insulating medium in the form of a dielectric fluid, e.g. an oil comprising a gelling component. The dielectric fluid may be electrically insulating oil to which gelling components have been added. In this context it should be understood that the component may consist of a mixture of part-components. The gel surrounding the capacitor elements in the container thus replaces the oil normally used for this purpose. Any damage to the container will not therefore result in oil leakage since no liquid oil is present. The consistency of the dielectric fluid prevents the formation of drops and it is therefore unable to leak out. Since the container is made of a polymer material and therefore yields to a certain extent and is negligibly sensitive to cracking, it has properties of significance in combination with the enclosed gel. The material combines good insulation ability with other desired features such as strength, manageability and cost. A design in accordance with the invention also offers favourable conditions for overcoming the problem of thermal conduction and insulation around the edges of the capacitor windings, which is a particular problem with power capacitors for high voltage.

It is known per se to gel an oil for use in electrical arrangements. PCT/SE 98/02314, for instance, describes the arrangement of an electrical arrangement comprising an electric conductor and an insulation system with a porous, fibre-based or laminated structure. The structure is impregnated with a dielectric fluid that is caused to solidify to a gel. The publication describes, inter alia, an application for impregnating a capacitor bank wound from metal and plastic foil. However, a capacitor element impregnated in this way does not eliminate the problem of leakage from the oil surrounding the capacitor elements in a container. This is because said arrangement describes a gel system in which the oil is thermo-reversible, i.e. at high temperature it becomes fluid. Neither does the publication solve this type of problem.

Additional examples are described in JP 716 12 68 and JP 103 26 721. However, this does not deal with power capacitors for high voltage either. JP 103 26 721 shows a capacitor in which the gel is intended to suppress mechanical vibrations. The object is thus completely different from that of the present invention, which is focused on the task of avoid an insulating fluid leaking out through the container. JP 103 26 721 shows a capacitor in which one side wall consists of urethane resin. The purpose is to prevent electrically conducting material penetrating out if the capacitor breaks, by avoiding cracks in the material through the addition of a more flexible material in the form of a gel. Here, too, it is a question of the gel being intended to achieve mechanical suppression.

In a preferred embodiment of the power capacitor in accordance with the invention the gel state of the dielectric fluid is thermostable throughout the entire temperature range occurring when the capacitor is in operation. Increased security against the occurrence of oil leakage is obtained by choosing the gelling component so that the gel state is retained even at relatively high temperatures. In accordance with a preferred embodiment the dielectric fluid is silicon-based, this applying in particular to the gelling silicon component. A capacitor is thus achieved which is extremely advantageous from the environmental aspect, for instance. A gel system that instead contains components such as polyurethane and/or isocyanates does not have such environmental advantages. Since these produce toxic gases in the event of a fire, they contribute to a hazardous working environment during manufacture and demands for safe waste management and destruction. Toxic gases are produced in the event of fire in a capacitor containing oil in accordance with said PCT/SE 98/02314. Furthermore, a gel system with such components has the drawback that these swell greatly and negatively influence the metallising film. Since an embodiment with metallised film, i.e. metal-coated film, is advantageous, this is a considerable drawback. Tests have shown that the films may even be destroyed. These drawbacks are avoided with a silicon-based gel system. This is therefore an embodiment of great significance.

The present invention is particularly advantageous for application in a power capacitor which is produced in known manner from capacitor elements in the form of rolled film of plastic and metal or a metal-coated film, wherein the gel is arranged to impregnate the wound capacitor element, possibly at its end portions, in order to avoid partial discharges. This thus constitutes a preferred embodiment of the power capacitor in accordance with the invention. Alternatively, such a winding can be performed dry.

In an alternative embodiment of such a power capacitor, a second dielectric fluid is arranged in the space between turns of the winding, which second dielectric fluid is in liquid form, i.e. not gelated.

The gel surrounding the capacitor elements in the container should fulfil certain requirements. It should thus display high shearing strength in gelated state, good thermal conductivity, high electric strength, be sufficiently electrically insulating and be thermostable within the temperature range occurring during operation.

In accordance with a preferred embodiment the dielectric fluid comprises an electrically insulating oil. The fluid is thus of a type that in high degree is capable of fulfilling said requirements. From this aspect, it is particularly suitable for the oil to comprise silicon oil.

In accordance with a preferred embodiment of the invention the gelling component comprises silicon, preferably polydimethyl siloxane with at least some vinyl substitutes, i.e. vinyl side groups.

In accordance with another preferred embodiment, the gelling component comprises silane-functional cross-linking agent. In a preferred alternative this cross-linking agent comprises silicon, suitably polydimethyl siloxane, with at least some silane substitutes.

The quantity of silane-functional cross-linking agent is preferably 1–80 per cent by weight.

The preferred gelling component, the preferred alternative thereof and the preferred content thereof contribute to the dielectric fluid acquiring favourable properties as regards the above requirements.

In a particularly preferred embodiment the dielectric fluid also comprises metal complex, which further contributes to satisfying the above requirements. Here, too, the quantity of metal complex mixed in is 2–4000 ppm, preferably 10–2000 ppm, which has been found to constitute a suitable amount.

In accordance with yet another preferred embodiment the dielectric fluid comprises silicon liquid of low molecular weight, preferably polydimethyl siloxane liquid. In this case also, a fluid is obtained that in gelled state satisfactorily fulfils the requirements set.

In accordance with another embodiment of the invention the dielectric fluid comprises an agent that retards gelation. This permits a well controlled and extended gelling process that facilitates manufacture and contributes to achieving good quality of the gel function.

A suitable quantity of the gelation-retarding component is 0.001–4 per cent by weight. In accordance with another preferred embodiment the composition of the dielectric fluid is 1–80 per cent by weight, preferably 20–50 per cent by weight, silane-functional cross-linking agent, 2–4000 ppm, preferably 10–2000 ppm metal complex, 0–60 per cent by weight, preferably 10–50 per cent by weight polydimethyl siloxane of low molecular weight, 0–4 per cent by weight gelation-retarding agent and the remainder polydimethyl siloxane with vinyl substitutes.

With such a composition the fluid acquires very suitable properties for insulating medium that fulfils the necessary requirements.

In accordance with an alternative, also preferred, embodiment the dielectric fluid comprises a vegetable oil, possibly mixed with silicon oil.

In accordance with a further preferred embodiment the gelling component comprises a vegetable oil.

In accordance with yet another embodiment of the invention at normal operating temperature the pressure in the gel is at least equivalent to atmospheric pressure.

In accordance with a preferred embodiment each capacitor element is substantially circular-cylindrical in shape and the inside of the container has corresponding circular-cylindrical shape so that the container closely surrounds each capacitor element, the axial direction of each capacitor element being oriented to coincide with the axial direction of the container.

Since the inside of the container has a circular-cylindrical shape corresponding to the cylindrical shape of the capacitor elements so that the container closely surrounds the capacitor elements, a capacitor is obtained that is as compact as possible and suited to an advantageous and electrically favourable shape of the elements from a manufacturing point of view.

In accordance with another embodiment the container is made of an electrically conducting material. The insulation between the capacitor elements and the container can therefore be simpler without risk of discharge between capacitor elements and container. Furthermore, the electrical connections of the capacitor can be made extremely simple and the creepage distance necessary between them can be provided by the container itself. With the simplification of the insulation and elimination of the lead-throughs, the capacitor will also be relatively compact, thereby enabling compact capacitor banks to be built.

A second aspect of the invention relates to the use of a gelled dielectric fluid to insulate capacitor elements arranged in a container. In preferred embodiments the gel has a composition corresponding to that stated above for the power capacitor in accordance with the invention. Similar advantages as those described above with regard to the invented power capacitor are gained with the use in accordance with the invention.

From a third aspect the object is achieved by means of the method defined in claim 23. A power capacitor in accordance with the invention is obtained in a practical way by means of this method.

In accordance with a preferred embodiment of the method in accordance with the invention the dielectric fluid is degassed before being introduced into the container. This increases the functional reliability of the capacitor since air bubbles are avoided in the gel, which might cause the appearance of surface glow. Such surface glow can cause erosion in the long run.

The above and other preferred embodiments of the power capacitor in accordance with the invention, the invented use and the invented method are defined in the sub-claims to respective claims 1, 21 and 23.

BRIEF DESCRIPTION OF THE DRAWINGS

FIG. 1 is a schematic view in perspective of a capacitor in accordance with a first embodiment of the invention, FIG. 2 illustrates a detail from FIG. 1, FIG. 3 constitutes a graph illustrating the heat development in the capacitor element shown in FIG. 2, FIG. 4 is an enlarged radial part section through the detail in FIG. 2, FIG. 4a is a section corresponding to FIG. 4, but illustrating an alternative embodiment, FIG. 4b is a section corresponding to FIG. 4, but illustrating another alternative embodiment.

ADVANTAGEOUS EMBODIMENTS OF THE INVENTION

Figure 5:
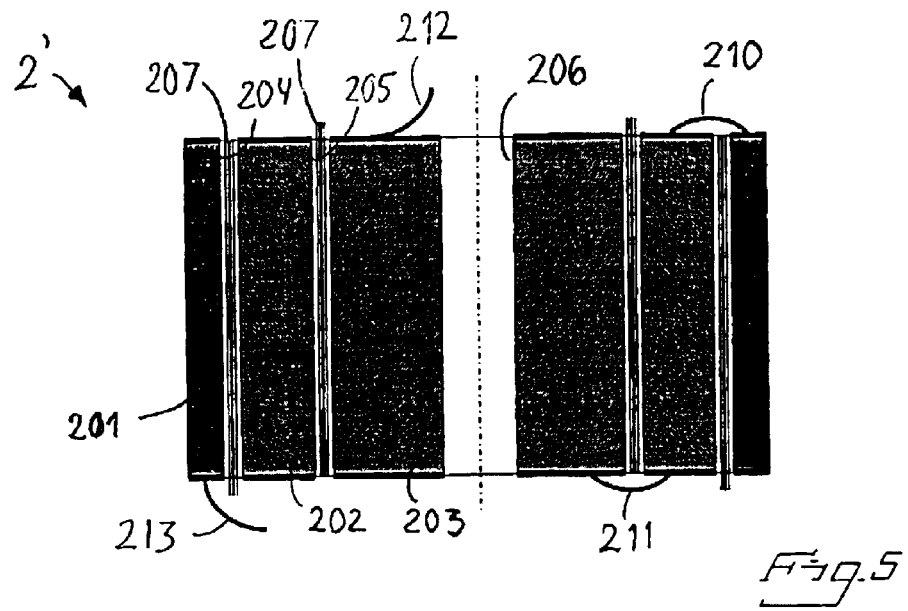
FIG. 5 is a longitudinal section through a capacitor element in accordance with an alternative embodiment.

FIG. 1 shows schematically the design of a capacitor in accordance with the invention. It consists of an outer container 1 of polyethylene which encloses, in this case, four capacitor elements (2a–2d). The container 1, like the capacitor elements 2a–2d, is circular-cylindrical. The capacitor elements 2a–2d are connected in series. Connection terminals 3, 4 are arranged at each end of the capacitor. Each terminal consists of a conducting foil mounted in the material of the container and extending therethrough. A gel 10 is arranged between the capacitor elements 2a–2d and the container. The gel serves as electrical insulation and thermal conductor.

FIG. 2 shows an individual capacitor element comprising metal-coated polymer films tightly rolled to a roll. The capacitor element 2 has an axially running hole 6 running centrally through it, which may be used for cooling the element. Typical dimensions for such a capacitor element are a diameter of 100–300 mm, a hole diameter of 20–90 mm, preferably at least 30 mm, and a height of 50–800 mm. Such a capacitor element is intended for a voltage of about 1–15 kV. A capacitor element with a diameter of 200 mm, a hole diameter of 60 mm and a height of 150 mm, for instance, is intended for a voltage of about 4–10 kV. Up to 40 kV is thus obtained with four of these connected in series, as shown in FIG. 1, and 80 kV is obtained with eight capacitor elements, etc.

Thermal losses arise in the capacitor element 2, resulting in internal heating of the element. The maximum temperature is critical for the electrical dimensioning. Higher temperature forces lower stress, which leads to lower output per volume unit, i.e. it has considerable influence on the consumption of material and the cost. In a cylindrical volume with homogenous heat generation, and with no opening at the centre, the temperature profile in radial direction will acquire an asymptotic appearance as indicated by the broken curve in FIG. 3. If the capacitor element is provided with a central opening 6 with radius Ri, the temperature profile will follow the unbroken curve in FIG. 3. Forced cooling is also possible if necessary. The temperature profile obtained will then be as indicated by the dotted line in FIG. 3.

FIG. 4 shows an enlarged radial part section through the capacitor element in FIG. 2. The part section shows two adjacent turns of the metal-coated film. The film 8a and 8b, respectively, is approximately 10 $\mu$m in thickness and the material is polypropylene. The metal layer 9a, 9b is approximately 10 nm thick and consists of aluminium or zinc or a mixture thereof, which has been vaporised onto the polypropylene film prior to rolling. With such a metallised film an electric stress E in the order of 250 V/$\mu$m can be reached. The technique of manufacturing a capacitor element in this way is already known and a more detailed description is therefore superfluous. Alternatively the capacitor elements can be built up using film foil technology where propylene film and aluminium foil are rolled up together. However, the use of metallised film has the advantage of self-healing and allows higher electrical stress and higher energy density than with the film foil technology.

The metal layer covers the plastic film from one side edge up to a short distance from its other side edge. A random area 16a of the film 8a thus lacks metal-coating. In similar manner a random area 16b of the film 8b lacks metal coating. The exposed random area 16b of the film 8b, however, is at the opposite end edge from that on the film 8a. Electrical connection for the layer 9a is obtained at the upper end of the element, seen in the drawing, and at the lower end of the layer 9b so that a plus electrode is obtained in one direction and a minus electrode in the other. To ensure efficient electrical contact the end portions may be sprayed with zinc.

In the modified embodiment shown in FIG. 4a the capacitor element has inner series-connection. Here the metal layer 9a, 9b on each plastic film 8a, 8b is divided into two portions 9a', 9a" and 9b', 9b", respectively, separated by an uncoated part 17a, 17b, respectively. It is also possible to divide the metal layers into more than two portions. Each pair of metal-layer portions, e.g. 9a' and 9b', forms a part capacitor element which is connected in series.

FIG. 4b shows a variant of the modified embodiment, where the metal layer 9a on only the one plastic film 8a is divided into two parts 9a', 9a" separated by an uncoated part 17a, whereas the metal layer 9b on the other plastic film 8b is undivided. Each of the parts 9a' and 9a" extends right out to the edge of the film 8b so that the electrical connection in this case occurs to the same film 8b. The metal layer 9b on the other plastic film terminates on both sides a short distance 16a, 16b from the edge of the film and is thus not electrically connected in any direction.

The gel between the capacitors elements (2a–2d) and the container consists of a component sold under the trade name Silgel®612 from Wacher-Chemie GmbH and comprises gel-forming components. Low-viscous silicon oil is mixed into this component. A component sold under the trade name "Inhibitor PT 88", also from Wacher-Chemie GmbH, constituting a gelation-retarding component, is mixed in in an alternative embodiment. A suitable silicon oil may be an oil sold under the trade name "Dow Corning®Silicone Transformer Liquid" from Dow Corning.

By way of example the liquid mixture that is to form the gel may be composed of about 60–70% of the gelling component, half consisting of Silgel®612A and half of Silgel®612B. The basic component, i.e. the silicon oil constitutes about 30–40%, the lower proportion being applicable if an inhibitor is used. The remainder, i.e. up to a few per cent, consists of the gelation-retarding component.

Experiment has shown that at a treating temperature of 23° C. solidification occurs in about an hour if no gelation-retarding component is present. With a mixture of 0.5 per cent by weight "Inhibitor PT 88", the solidification time is extended to just over 10 hours. With 1% a solidification time of about 100 hours is achieved, and with more than 2% the time will be over 150 hours. The inclusion of about 1% gelation-retarding component is probably suitable and gives sufficiently long solidification time at 60° C. treating temperature.

The liquid mixture is permitted to penetrate between the film layers so that the capacitor element becomes impregnated at least at the side edges. The liquid with the various components is degassed and combined to a mixture. The mixture is introduced through an inlet in the container by means of a pressure difference achieved by means of a pump or a vacuum, for instance.

FIG. 2 illustrates how a power capacitor in accordance with the present invention can be constructed for various types of capacitor elements. In all cases a capacitor element 2 is surrounded in a container 1 by the dielectric fluid 10 comprising gelling component, and is in gel form in the container.

In principle, the capacitor element 2 may be constructed in accordance with three different alternatives as regards the present of dielectric fluid inside the element. In accordance with a first alternative the capacitor element 2 may be dry, i.e. no dielectric fluid at all is present inside its winding. According to a second alternative the capacitor element contains a dielectric fluid that is gelled in equivalent manner to the surrounding gel 10. This may be particularly relevant in the end regions A. According to a third alternative the capacitor element 2 is impregnated with a dielectric fluid such as an oil which does not gel. Here, too, it may be a question of only the end regions A being impregnated.

The first alternative is primarily of interest in the case of tightly wound capacitor elements, particularly of the type having a metal-coated plastic film. The other two alternatives are primarily of interest for loosely wound capacitor elements, particularly of the type in which separate plastic films and metal foils are used in the winding.

FIG. 5 shows a longitudinal section of an alternative embodiment of a capacitor element 2' in accordance with the invention. The capacitor element is divided into three sub-elements 201, 202, 203 which are concentric with the common axis designated A. The outermost sub-element 201 is substantially tubular, with an inner side 204 surrounding the intermediate sub-element 202 with a small space. The intermediate sub-element similarly has an inner side 205 that closely surrounds the innermost sub-element 203. The innermost sub-element 203 has a central channel 206 running through it. The three sub-elements have different radial thickness, the outermost having the smallest thickness. The sub-elements thus have substantially the same capacitance. Insulation 207 is arranged between the sub-elements.

The sub-elements are connected in series. Two radially adjacent sub-elements have one of their coupling points at the same end. The outermost sub-element 201 is thus connected by the coupling member 210 to the intermediate sub-element 202 at one end of the capacitor element 2', and the intermediate sub-element 202 is connected by the coupling member 211 to the innermost sub-element 203 at the other end of the capacitor element 2'. This means that the connections 212, 213 for the capacitor element 2' are located at opposite ends thereof.

If the number of sub-elements is greater than three, e.g. five or seven, connection of the coupling points at the ends of the sub-elements is continued alternately in the same way.

Figure 6:
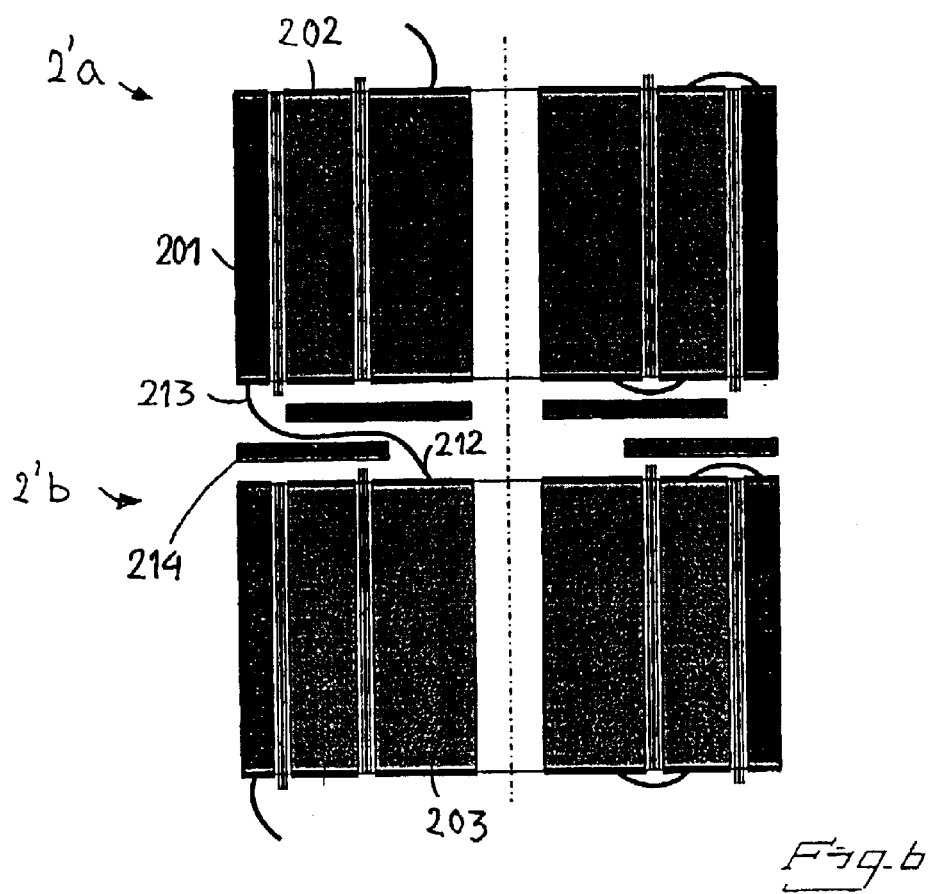
FIG. 6 shows two capacitor elements as shown in FIG. 5, connected together.

FIG. 6 illustrates how a plurality of capacitor elements of the type shown in FIG. 5 can be connected together in series. The figure shows two such capacitor elements 2'a, 2'b. The connection 212 of the lower capacitor element 2'b at the upper end of the inner sub-element 203 is coupled to the connection 213 of the upper capacitor element 2'a at the lower end of the outermost sub-element 201. Insulation 214 is arranged between the capacitor elements in order to deal with the potential differences occurring in this type of capacitor element.

Figure 7:
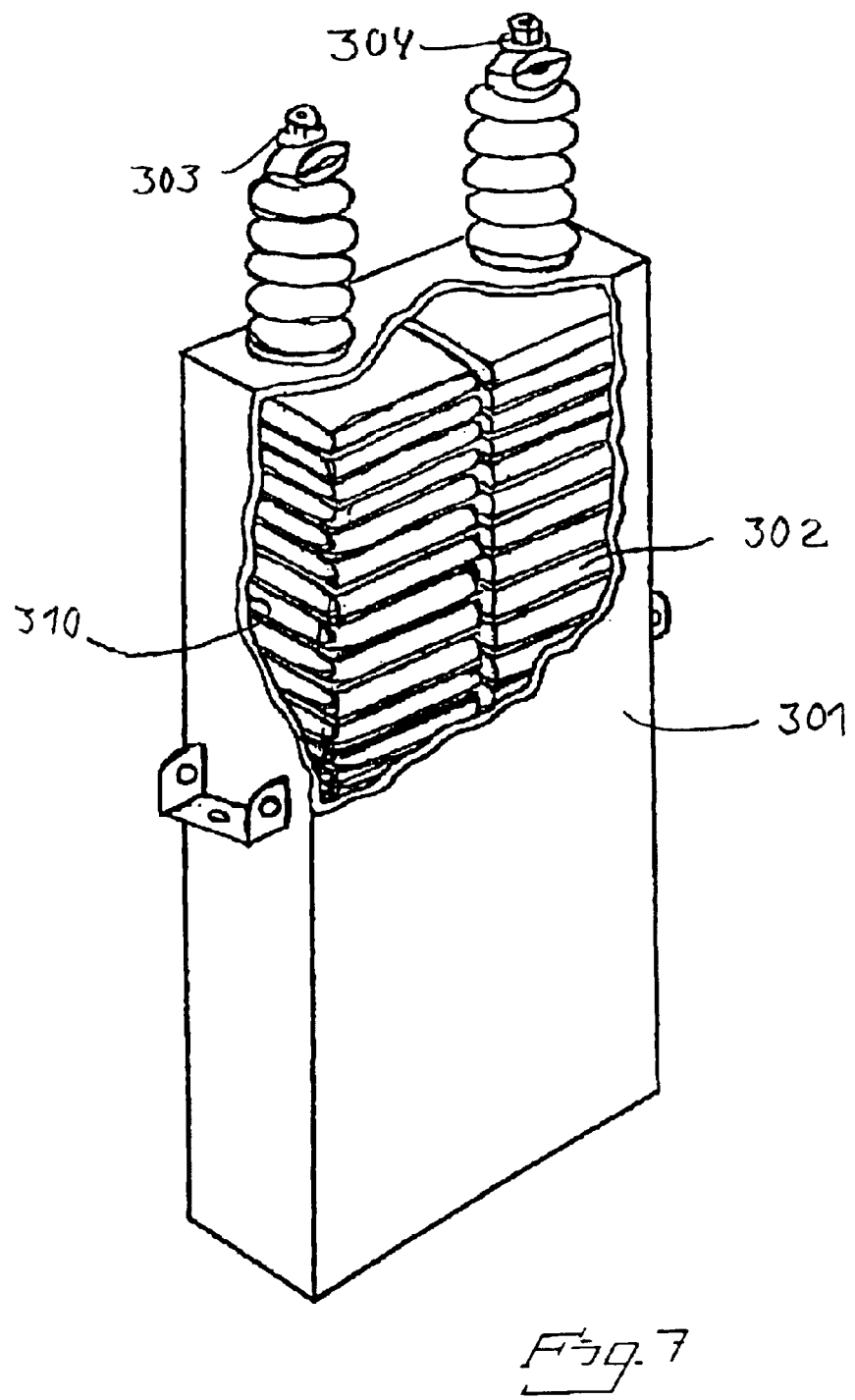
FIG. 7 is a view in perspective of a capacitor in accordance with another embodiment of the invention.

FIG. 7 shows another example of a power capacitor in accordance with the invention. In this example the design of the container 301 and capacitor element 302 is of conventional type. The capacitor container 301 is thus box-shaped and the capacitor element 302 is wound to flattened units stacked one on top of the other. The electrical connection terminals 303, 304 are directed the same way. A gel 310 is arranged in the space between the capacitor elements 302 and container 301 in similar manner to the embodiments described above.

What is claimed is:

1. A power capacitor for high voltage comprising:
   at least one capacitor element enclosed in a container such that a space is formed between each capacitor element and the container; and
   an insulating medium arranged inside the container in a form of a dielectric fluid comprising gelling component, which said insulating medium substantially fills said space; and
   wherein the container is made of a polymer material.

2. A power capacitor as claimed in claim 1, wherein the gelling component comprises silicon.

3. A power capacitor as claimed in claim 2, wherein the silicon comprises polydimethyl siloxane.

4. A power capacitor as claimed in claim 2, wherein the silicon comprises vinyl substitutes.

5. A power capacitor as claimed in claim 1, wherein the gelling component of the dielectric fluid is thermostable throughout an entire temperature range occurring when the capacitor is in operation.

6. A power capacitor as claimed in claim 1, wherein each capacitor element comprises film that is rolled plural turns to form a roll, which film comprises layers of plastic and layers of metal or metal-coated plastic film, a second dielectric fluid being arranged in a space between turns of the film, at least in a region of ends of the roll, which second dielectric fluid is in liquid form.

7. A power capacitor as claimed in claim 1, wherein each capacitor element comprises film that is rolled plural turns to form a roll, which film comprises layers of plastic and layers of metal or metal-coated plastic film, the dielectric fluid being also arranged in a space between turns of the film, at least in a region of ends of the roll.

8. A power capacitor as claimed in claim 1, wherein the dielectric fluid comprises an electrically insulating oil, preferably silicon oil.

9. A power capacitor as claimed in claim 2, wherein the gelling component comprises silane-functional cross-linking agent.

10. A power capacitor as claimed in claim 9, wherein the silane-functional cross-linking agent comprises silicon, preferably polydimethyl siloxane, with at least some silane substitutes.

11. A power capacitor as claimed in claim 9, wherein a quantity of silane-functional cross-linking agent is 1–80 per cent by weight.

12. A power capacitor as claimed in claim 2, wherein the dielectric fluid also comprises metal complex.

13. A power capacitor as claimed in claim 12, wherein a quantity of metal complex is 2–4000 ppm, preferably 10–2000 ppm.

14. A power capacitor as claimed in claim 12, wherein the dielectric fluid comprises silicon liquid of low molecular weight, preferably polydimethyl siloxane liquid.

15. A power capacitor as claimed in claim 2, wherein the dielectric fluid comprises an agent configured to retard gelation.

16. A power capacitor as claimed in claim 2, wherein a composition of the dielectric fluid is 1–80 per cent by weight silane-functional cross-linking agent, 2–4000 ppm, preferably 10–2000 ppm metal complex, 0–60 per cent by weight, preferably 10–50 per cent by weight, polydimethyl siloxane of low molecular weight, 0–4 per cent by weight gelation-retarding agent and a remainder polydimethyl siloxane with vinyl substitutes.

17. A power capacitor as claimed in claim 8, wherein the dielectric fluid comprises a vegetable oil.

18. A power capacitor as claimed in claim 1, wherein the dielectric fluid is under a pressure at least equivalent to atmospheric pressure.

19. A power capacitor as claimed in claim 1, wherein each capacitor element is substantially circular-cylindrical in shape and an inside of the container has a corresponding circular-cylindrical shape so that the container closely surrounds each capacitor element, an axial direction of each capacitor element being oriented with an axial direction of the container.

20. A power capacitor as claimed in claim 1, wherein the container encloses a plurality of capacitor elements connected in series, and wherein an electric connection terminal is arranged at each end of the container, the container itself constituting insulation between the connection terminals.

21. The use of a gelled dielectric fluid as an insulating medium for insulating one or more capacitor elements in a power capacitor for high voltage, which capacitor elements are arranged in a container of a polymer material.

22. Use as claimed in claim 21, wherein the dielectric fluid comprises a gelling component comprising silicon.

23. A method for manufacture of a power capacitor as claimed in claim 1, wherein the at least one capacitor element is arranged in the container, the dielectric fluid capable of gelling is introduced into the space between each capacitor element and the container, after which the dielectric fluid is caused to gel.

24. A method as claimed in claim 23, wherein the dielectric fluid is degassed before being introduced into the container.

* * * * *